(12) United States Patent
Pierce

(10) Patent No.: US 6,830,112 B2
(45) Date of Patent: Dec. 14, 2004

(54) FRONT HITCH SYSTEM

(75) Inventor: Martin (Marty) Pierce, North Royalton, OH (US)

(73) Assignee: MTD Products Inc, Valley City, OH (US)

(*) Notice: Subject to any disclaimer, the term of this patent is extended or adjusted under 35 U.S.C. 154(b) by 92 days.

(21) Appl. No.: 10/280,326

(22) Filed: Oct. 25, 2002

(65) Prior Publication Data

US 2003/0085046 A1 May 8, 2003

Related U.S. Application Data

(60) Provisional application No. 60/336,061, filed on Oct. 26, 2001.

(51) Int. Cl.$^7$ .................. A01B 59/043; A01B 59/06; A01B 63/02; A01B 63/118
(52) U.S. Cl. ........................................ 172/439
(58) Field of Search .................. 172/439, 443, 172/444, 445, 47, 677, 678, 679, 680, 684.5, 776; 280/186

(56) References Cited

U.S. PATENT DOCUMENTS

| | | | |
|---|---|---|---|
| 3,883,010 A | * | 5/1975 | Heslop |
| 4,181,181 A | * | 1/1980 | Old ............................ 172/443 |
| 5,346,018 A | | 9/1994 | Koster |
| 5,533,856 A | | 7/1996 | Friesen et al. |
| 5,823,270 A | | 10/1998 | Cooper |
| 5,971,082 A | | 10/1999 | Satzler |
| 6,089,328 A | | 7/2000 | Moore et al. |
| 6,230,817 B1 | * | 5/2001 | Haugen ........................ 172/7 |

* cited by examiner

Primary Examiner—Christopher J. Novosad
(74) Attorney, Agent, or Firm—Wegman, Hessler & Vanderburg

(57) ABSTRACT

A hitch assembly includes a base member, an extension arm and an A-frame for supporting any of a plurality of implements. An elevating cylinder is connected to raise and lower the extension arm. Additionally, lateral cylinders are synchronized to move in unison to pivot the hitch assembly laterally side to side. The first respective ports of the lateral cylinders are directly connected together facilitate synchronous movement. A universal joint is connected between the arm and A-frame to coordinate up and down and left and right movement of the hitch assembly.

12 Claims, 6 Drawing Sheets

FRONT HITCH SYSTEM

This application claims priority from Provisional application, Ser. No. 60/336,061, filed Oct. 26, 2001 and titled FRONT HITCH SYSTEM.

1. BACKGROUND OF THE INVENTION

A. Field of Invention

This invention relates to the art of tractors hitches, and more specifically to multi-axes tractor hitches having an A-frame attached bracket that does not bind when actuated.

B. Description of the Related Art

Hitches are well known in the art to be attached to a tractor or other utility vehicle. Hitches are typically constructed to receive one of a plurality of implements, such as snowplows, dirt plows and the like. Vehicles hitches may include multiple cylinders and a complex configuration of structural support members that facilitate maneuvering the hitch assembly up/down and left/right.

In one aspect of hitch operation, the cylinders that move the hitch can bind the structural support members during operation, reducing performance of hitch assembly. Additionally, multiple axes of movement within the hitch assembly can further complicate coordination of engaging the hitch actuators, which may be hydraulic cylinders, further requiring complex and expensive mechanisms to control movement of the hitch assembly. What is needed is a simple and effective way to simultaneously actuate multiple actuators facilitating multiple axes of movement for the hitch assembly.

II. SUMMARY OF THE INVENTION

It is the primary object of the present invention to provide a tractor implement hitch that reduces the space requirements and that can be vertically adjusted and laterally pivoted.

It is another object of the present invention to reduce the moment arm forces of a hitch assembly.

It is yet another object of the present invention to provide remote control of the adjustable hitch axes.

It is even another object of the present invention to provide simultaneous movement of the hitch axes.

It is still yet another object of the present invention to provide synchronized movement of the actuators.

In accordance with the present invention, there is provided: a tractor having wheels and an engine mounted thereon for providing power to the tractor. A hitch is provided, having a hitch frame, wherein the hitch frame is fixedly connected to the tractor frame for use in supporting and maneuvering an associated implement. The hitch is comprised of an assembly of rigid frame members operatively connected to a plurality of actuating means for use in orienting the hitch with respect to the tractor frame. A tractor pump is provided for use in supplying hydraulic power to the hitch actuating means. The hydraulic power is controlled by a valve means, which is operatively connected to a control lever, wherein an operator selectively adjusts the lever, resulting in adjustment of the orientation of the hitch assembly.

Other objects and advantages of the invention will appear from the following detailed description of the preferred embodiment of the invention with reference being made to the accompanying drawings.

BRIEF DESCRIPTION OF DRAWINGS

The invention may take physical form in certain parts and arrangement of parts, a preferred embodiment of which will be described in detail in this specification and illustrated in the accompanying drawings which form a part hereof and wherein.

IV. DESCRIPTION OF THE PREFERRED EMBODIMENT

Figure 1:
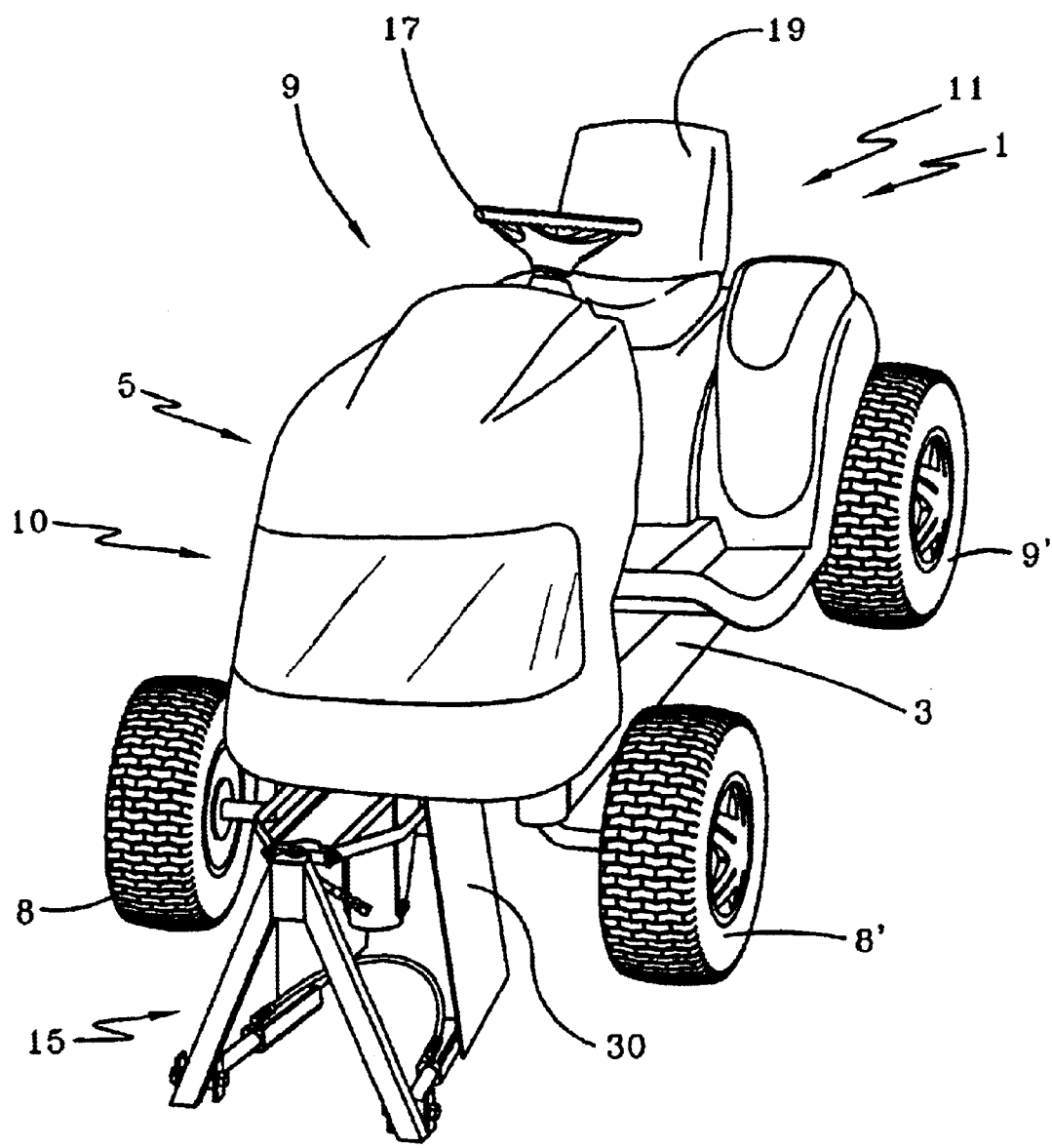
FIG. 1 is a perspective view of a tractor with a hitch assembly.

Referring now to the drawings wherein the showings are for purposes of illustrating a preferred embodiment of the invention only and not for purposes of limiting the same, FIG. 1 depicts a tractor shown generally at 1. The tractor 1 may have a frame 3 for supporting the components of the tractor 1. An engine is shown generally at 5 for use in providing power to the tractor 1. The engine 5 may be connected to the frame 3 in a manner well known in the art. The tractor 1 may include first and second front ground engaging wheels 8, 8' and first and second rear ground engaging wheels 9, 9'. However, any number of ground engaging wheels may be chosen with sound engineering judgment. The ground engaging wheels 8, 8', 9, 9' may be rotatably connected with respect to the frame 3 of the tractor 1 for use in facilitating locomotion for the vehicle 1. The tractor 1 may have first and second ends 10, 11, which may be front and rear ends 10, 11. A hitch 15 may extend from the frame 3 of the tractor 1 proximate to the first end 10 of the tractor 1. More specifically the hitch assembly 15, or hitch 15, may include a base member 30 that is fixedly attached to the frame 3 via fasteners or other attaching means. It should be noted at this point that the hitch 15 may be operatively connected to any end of the tractor 1. A steering member 17, which may be a steering wheel 17', is shown that may be operatively connected to pivot the front ground engaging wheels 8, 8' for use in providing steering to the vehicle 1. However, it is noted that any manner type of steering member 17 may be used to steering the vehicle 1. Additionally, any manner of steering the tractor 1 may be chosen with sound engineering judgment including but not limited to Zero Radius Turning steering. In that steering, and Zero Radius Turning steering, is well known in the art no further explanation will be offered at this time. A seat 19 may be attached to the frame 3 for an associated operator during operation of the tractor 1.

Figure 2:
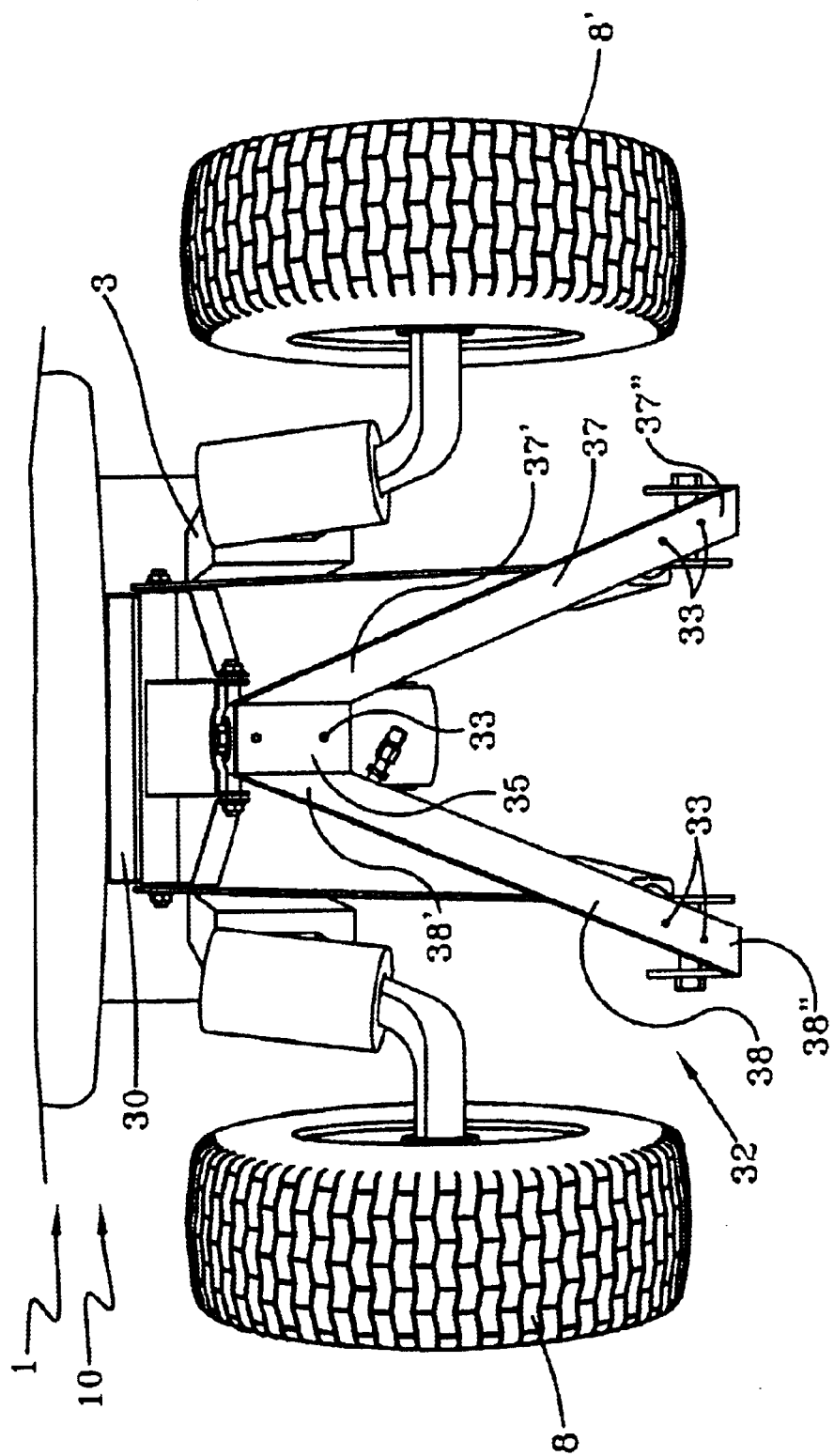
FIG. 2 is a close-up view of the front of the tractor showing the hitch assembly.

Referring now to FIG. 2, a front view of the hitch 15 is shown. The hitch 15, as previously mentioned, may include a base member 30. The hitch 15 may also include an implement-mounting bracket 32. The implement-mounting bracket 32, or bracket member 32, may receive one of any number of associated implements selectively connected thereto. In this manner, the bracket member 32 may receive a plow, not shown, that is selectively fixedly connected to the bracket member 32 for use in moving earth, snow or the like. It is noted that any type of associated implement may be operatively connected to the bracket member as chosen with sound engineering judgment. Therefore, the bracket member 32 may include mounting apertures 33 for use in receiving fasteners that may selectively fixedly connected the associated implement to the bracket member 32. In the preferred embodiment, the bracket member 32 may be a rigid member having an A-frame configuration. The A-frame bracket member 32 may have an apex 35 and first and second legs 37, 38. The legs 37, 38 may each have first 37', 38' and second 37", 38" ends respectively. The first ends 37', 38' may be juxtaposed to the apex 35 and fixedly connected thereto. The legs 37, 38 may be welded to the apex 35. However, any means of securing the legs 37, 38 to the apex 35 may be chosen with sound engineering judgment. It is noted at this point that any material may be used to construct the bracket member 32 that is chosen with sound engineering judgment.

Figure 3:
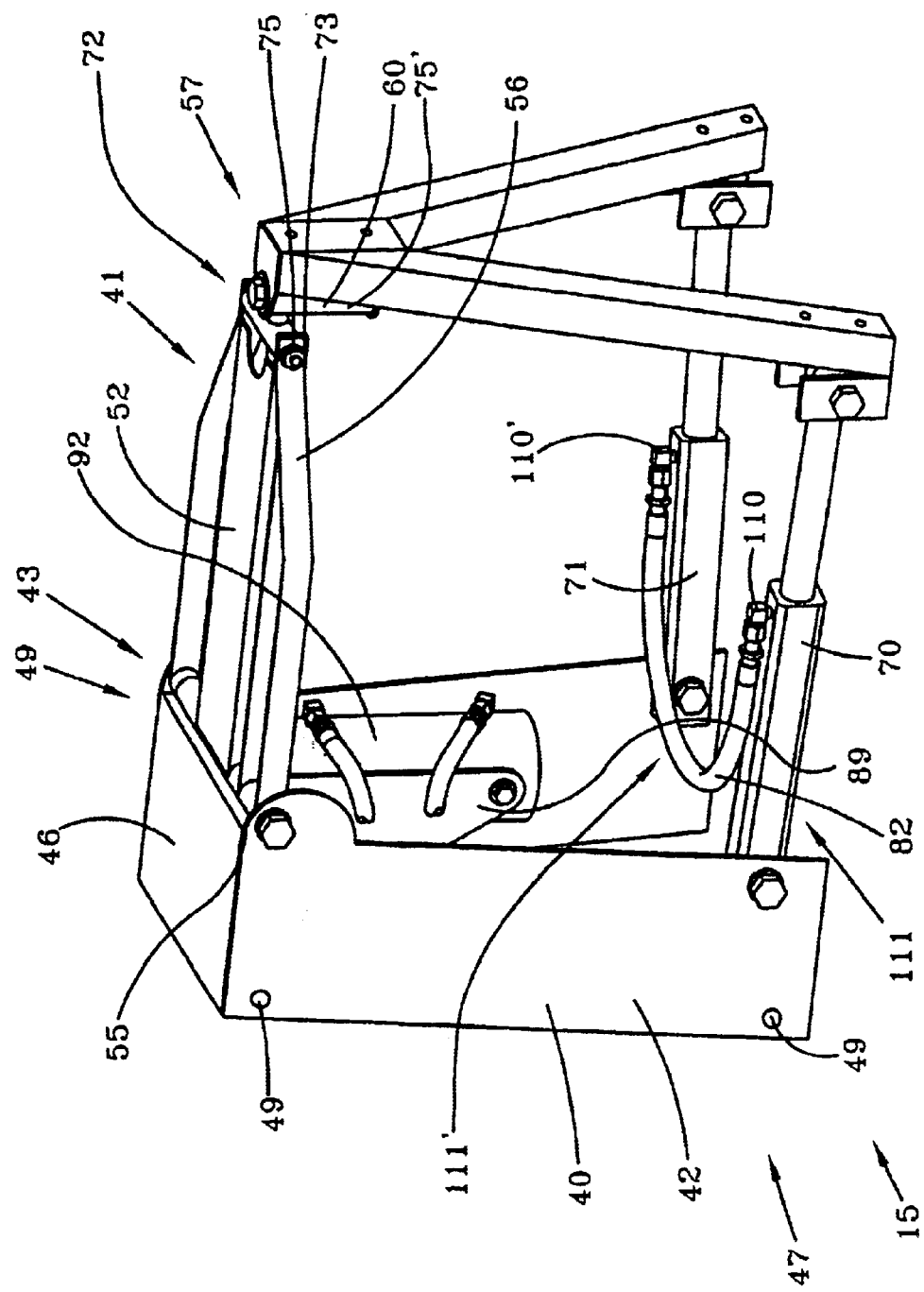
FIG. 3 is a side perspective view of the hitch assembly.

With reference to FIGS. 1 through 3, FIG. 3 shows the hitch assembly 15 having a hitch-mounting bracket 40 or base member 40, which may be fixedly attached to the frame 3 of the tractor 1, not shown in FIG. 3. The hitch-mounting bracket 40 may be formed from two side plates 42, 43, an upper cross plate 46 and a lower cross plate 47. The two side plates 42, 43 may be disposed substantially parallel to each other and oriented substantially vertical. The generally planar upper cross plate 46 has a first and second ends and may be affixed to side plates 42, 43 at each of the respective ends and more specifically at an upper end of the base member 40. The base member 40 may have a plurality of openings 49 fashioned therein for use in fixedly securing the base member 40 to the frame 3 of the tractor 1. Inasmuch as fastening means and fastening a base member to a frame are well known in the art, any such means may be chosen with sound engineering judgment for securing the base member 40 to the frame 3 of the tractor 1. It is contemplated in an alternate embodiment that the base member 40 may be integrally formed with the frame 3 of the tractor 1. However, in the preferred embodiment, the base member 40 is a separate member and may be fixedly connected to the frame 3 in any manner chosen with sound engineering judgment.

Figure 4:
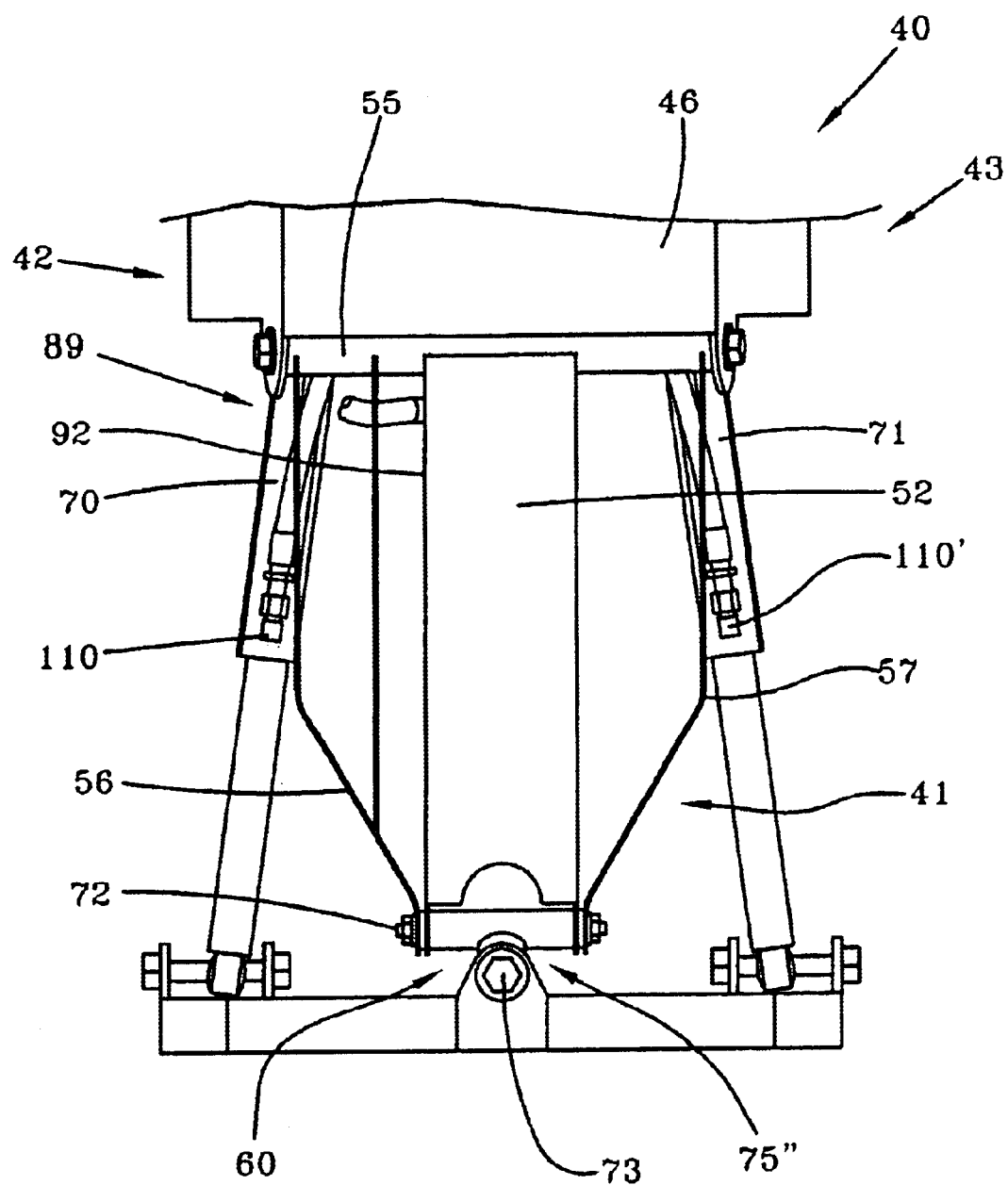
FIG. 4 is a top view of the hitch assembly.

Referring again to FIG. 3 and now to FIG. 4, FIG. 4 shows a top view of the hitch 15. The hitch 15 may include a support assembly 41 that may be constructed from a generally tubular extension arm 52, crossbar 55 and left and right side braces 56, 57. At the first end of the assembly 41, the crossbar 55, being generally cylindrical, may be disposed parallel to the upper cross plate 46 and pivotally attached between the side plates 42, 43 of the base 40. The extension arm 52 may be perpendicularly rigidly attached to the crossbar 55 at a first end and extends away from the frame 3 of the tractor 1. First ends of the left and right side braces 56, 57 may be fixedly attached to opposing ends of the crossbar 35 respectively, as shown in FIG. 4. Each of the seconds ends of the left and right side braces 56, 57 and of the extension arm 42 terminate at the second end of the support assembly 41 and are fixedly attached to a multi-axes hitch joint 60, which is discussed in detail below. In this manner, the first end of the elevating support assembly 41 is pivotally attached with respect to the base member 40 for use in raising and lowering the support assembly 41, the A-frame 32 and an associated implement. In other words, the support member 41 may be pivoted in a first direction up and down in a second direction with respect to a horizontal plane.

With continued reference to FIGS. 3 and 4, the multi-axes hitch joint 60, which may be a universal joint is rotatably connected to the second end of the support assembly 41 and to the rearward side of the A-frame member 32 respectively. The universal joint 60 has two generally longitudinal axle housings 75, 75', which may be a single integral housing member 75", fixedly juxtaposed substantially perpendicular to each other. Each of the axle housings 75, 75' is generally cylindrical in configuration for use in receiving rotating axle members 72, 73. Bushings may be included within each of the axle housings for providing reduced friction contact during normal operation. The axle housing 75 may subsequently be rotatably attached to the second end of the support assembly 41. Similarly, axle housing 75' may be rotatably with respect to the apex 35 of A-frame. In this manner, the universal joint 60, and consequently the A-frame, is pivotally connected to the extension arm 52. In the preferred embodiment, the first axle 72 and respective axle housing 75 is attached about a longitudinal axis to the second end of the extension arm 52 and is disposed substantially parallel to a horizontal plane. And the second axle housing 75' is attached about a longitudinal axis to the rearward side of the A-frame 32 and is disposed substantially parallel to a vertical plane. In this way, the A-frame 32 and associated implement can be rotated in a first direction up and down about the first axle and in a second direction laterally side-to-side about the second axle.

With continued reference to FIGS. 3 and 4, FIG. 4 shows left and right side motion hydraulic cylinders 70, 71 each having first and second ends for use in providing power to laterally pivot the A-frame 32. The present figures show the preferred embodiment of actuating the lateral pivoting motion of the A-frame 32 although any such means can be chosen with sound engineering judgment such that equal force and opposite motion is applied respectively to each of the legs 37, 38. The first ends of the cylinders 70, 71 are pivotally secured to the base member 40, shown in FIG. 3. Likewise, the second ends of the cylinders 70, 71 are pivotally secured to the each of the seconds ends of the legs 37, 38, as shown in FIG. 4. In order to pivot the A-frame 32 in one direction, hydraulic power is supplied to a first cylinder 70 or 71 forcing the cylinder rod outward while simultaneously releasing hydraulic power to draw the opposing cylinder rod inward. It is imperative that the cylinder motions be actuated with equal and opposite force and speed to prevent binding of the multi-axes hitch joint 60. Equal and opposite motion is accomplished by communicating, with a connecting hose 82, the first hydraulic ports of each of one side of the double acting cylinders 70, 71 thereby creating a closed hydraulic system, which is separated from the remaining hydraulic supply. In this way, hydraulic fluid from the first port of the extending cylinder is directed into the first port of the retracting cylinder thereby creating equal and opposite force and motion.

Referring once again to FIGS. 3 and 4, FIG. 3 shows a side view of a cylinder support arm 89 extending from the base member 40. A height-adjusting or elevating cylinder 92 is also shown having first and second ends and a cylinder rod. The first end of the cylinder 92 is pivotally attached to the support arm 89. The cylinder rod extends from the second end of the cylinder 92 and is pivotally attached to the left side brace 56 for use in controlling the elevation of the extension arm 52. Hydraulic power supplied to and released from the cylinder 92 accomplishes the raising and lowering of the cylinder rod and consequently the extension arm 52.

Figure 5:
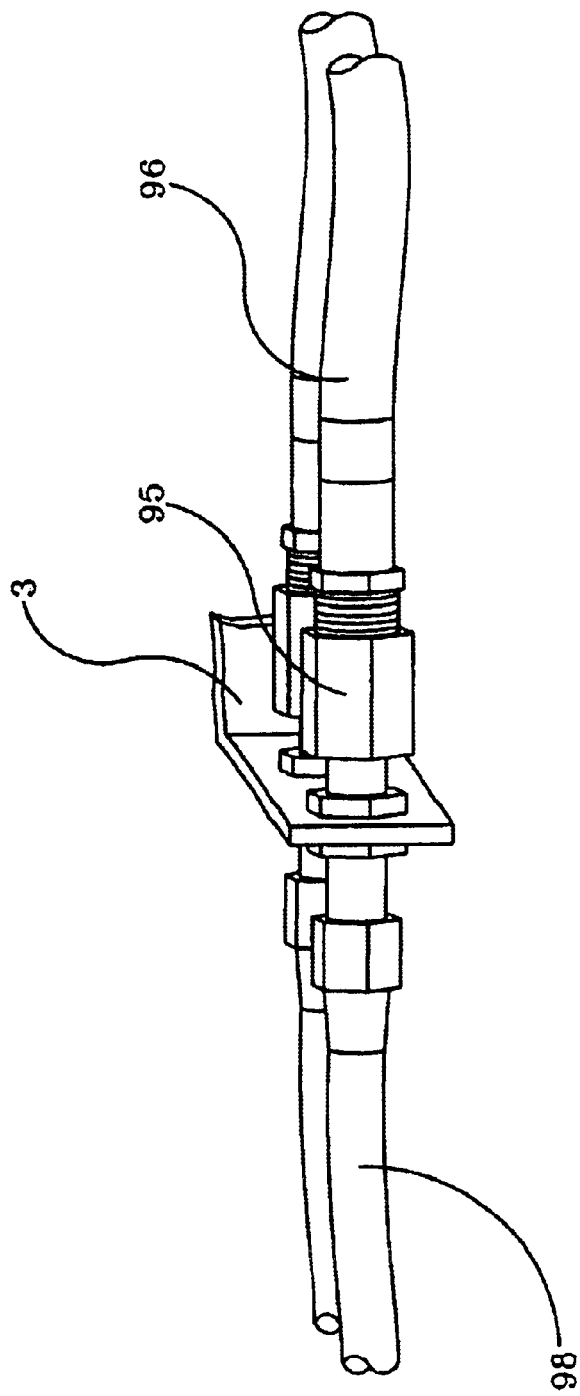
FIG. 5 is a partial cutaway view of the frame of the tractor and hydraulic hoses and tubes.
Figure 6:
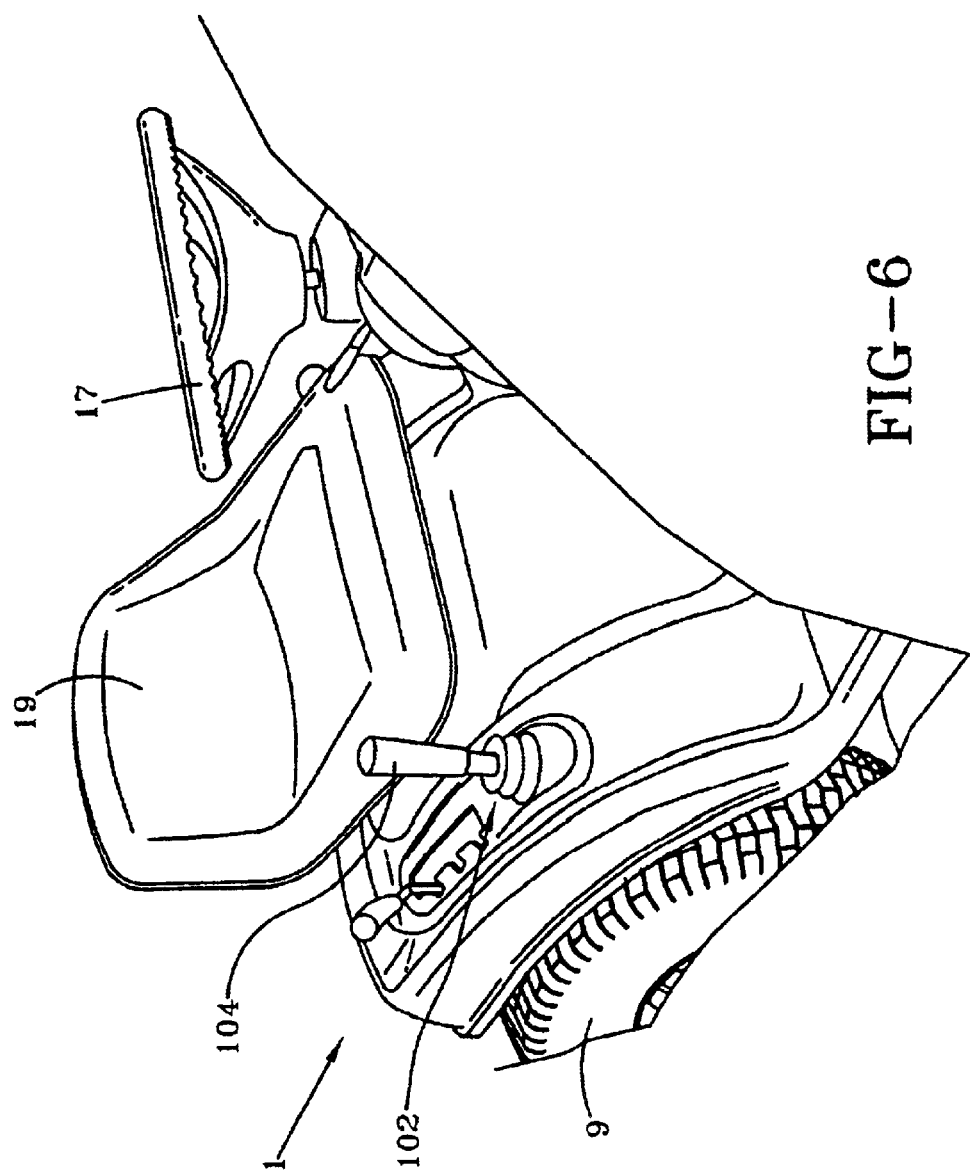
FIG. 6 is a perspective view of the tractor showing the remote control lever for actuating the hitch assembly.

Referring now to FIGS. 5 and 6, FIG. 5 shows hydraulic fittings 95 and hoses 96 for supplying hydraulic fluid power to the cylinders 70, 71 and 92. The fittings 95 may be of the quick connection type for ease of installation of the power supplying components, which may be hydraulic pumps, not shown. Additionally tubing 98 may be used channel fluid power to the appropriate actuator as is well known in the art. It is noted that any manner of supplying fluid power to the actuators 70, 71 and 92 may be chosen with sound engineering judgment. FIG. 6 shows a control valve 102 that may be operably connected to the hydraulic system via hoses 96 and tubes 98 in a manner well known in the art. The valve 102 provides selective control of the hydraulic power, supplied from a pump, not shown, to the cylinders 70, 71 and 92. A lever 104 may be operably connected to the valve 102, which provides a control means by which the associated operator may selectively actuate the valve 102 consequently supplying hydraulic power to the cylinders 70, 71 and 92. This may function to actuate the elevating cylinder 92 lifting the A-frame member 32 up in a first elevating direction and down in second elevating direction. Likewise, the lateral cylinders 70, 71 when engaged function to maneuver the A-frame member 32 laterally side to side in first and second directions. As mentioned previously, the first ports of the cylinders 70, 71 may be directly connected together. In this manner, when one of the cylinders 70, 71 is engaged fluid power may be directed into the second port 111, 111' of that cylinder. Resultantly, fluid power is directed out of the second port of the first lateral cylinder through the hose 82 into the second port of the second lateral cylinder, forcing the piston of the second lateral cylinder inward. In other words, when the first lateral cylinder is engaged fluid from the first lateral cylinder actuates the second lateral cylinder. Functionally, when the first lateral cylinder is engaged via the control valve 102 and lever 104, the same valve 102 and lever 104 may shift a hydraulic valve to connected the first port of the second lateral cylinder to tank in a manner well known in the art. It this way, the lateral cylinders 70, 71 engage in unison and move simultaneously, thus preventing the hitch 15 from binding during operation. It is noted that any configuration of hydraulic circuitry may be chosen engage the actuators of the present invention that is consistent with the description of the present invention.

While specific embodiments of the invention have been described and illustrated, it is to be understood that these embodiments are provided by way of example only and that the invention is not to be construed as being limited thereto but only by proper scope of the following claims.

I claim:

1. A hitch assembly for use on an associated vehicle, comprising:
    a base member;
    an extension arm having first and second ends, the first end of the extension arm being operatively rotatably connected with respect to the base member;
    a bracket member pivotally connected with respect to the second end of the extension arm, wherein the bracket member has an apex and first and second distal ends;
    a single elevating actuator operatively communicated between the base member and the extension arm, the elevating actuator being actuated by an associated power source;
    a single universal joint member operatively connected between the extension arm and the bracket member, wherein the universal joint is operatively connected between the second end of the extension arm and the apex;
    first and second fluid cylinders having first and second ends respectively, wherein the first ends of the first and second fluid cylinders are operatively pivotally connected to the base member, and,
    wherein the second ends of the first and second fluid cylinders are operatively pivotally connected to the first and second distal ends of the bracket member respectively.

2. The hitch assembly of claim 1, wherein the first and second fluid cylinders are actuated simultaneously.

3. The hitch assembly of claim 2, wherein the first and second fluid cylinders have first and second ports respectively and wherein the first port of the first fluid cylinder is operatively directly connected to the first port of the second cylinder for use in simultaneously actuating the first and second cylinders.

4. The hitch assembly of claim 3, wherein the connection between the first port of the first fluid cylinder and the first port of the second fluid cylinder creates a closed fluid system that operates independently from other fluid systems.

5. The hitch assembly of claim 4, wherein the force created by the first fluid cylinder is equal and opposite to the force created by the second fluid cylinder.

6. The hitch assembly of claim 2, wherein movement of the first and second fluid cylinders prevent binding during operation.

7. The hitch assembly of claim 3 further comprising:
    a remote control mechanism for actuating the hitch assembly.

8. A hitch assembly for use on an associated vehicle, comprising:
    a base member;
    an extension arm having first and second ends, the first end of the extension arm being operatively rotatably connected with respect to the base member;
    a bracket member pivotally connected with respect to the second end of the extension arm, wherein the bracket member has an apex and first and second distal ends;
    at least a first elevating actuator operatively communicated between the base member and the extension arm, the first elevating actuator being actuated by an associated power source; and,
    first and second fluid cylinders having first and second ends respectively, the first ends of the first and second fluid cylinders are operatively pivotally connected to the base member, the second ends of the first and second fluid cylinders are operatively pivotally connected to the first and second distal ends of the bracket member respectively, wherein the first and second fluid cylinders have first and second ports respectively and wherein the first port of the first fluid cylinder is operatively directly connected to the first port of the second cylinder for use in simultaneously actuating the first and second cylinders.

9. The hitch assembly of claim 8, wherein the connection between the first port of the first fluid cylinder and the first port of the second fluid cylinder creates a closed fluid system that operates independently from other fluid systems.

10. The hitch assembly of claim 9, wherein the force created by the first fluid cylinder is equal and opposite to the force created by the second fluid cylinder.

11. The hitch assembly of claim 10, wherein movement of the first and second fluid cylinders prevent binding during operation.

12. The hitch assembly of claim 10 further comprising:
    a remote control mechanism for actuating the hitch assembly.

* * * * *